UNITED STATES PATENT OFFICE.

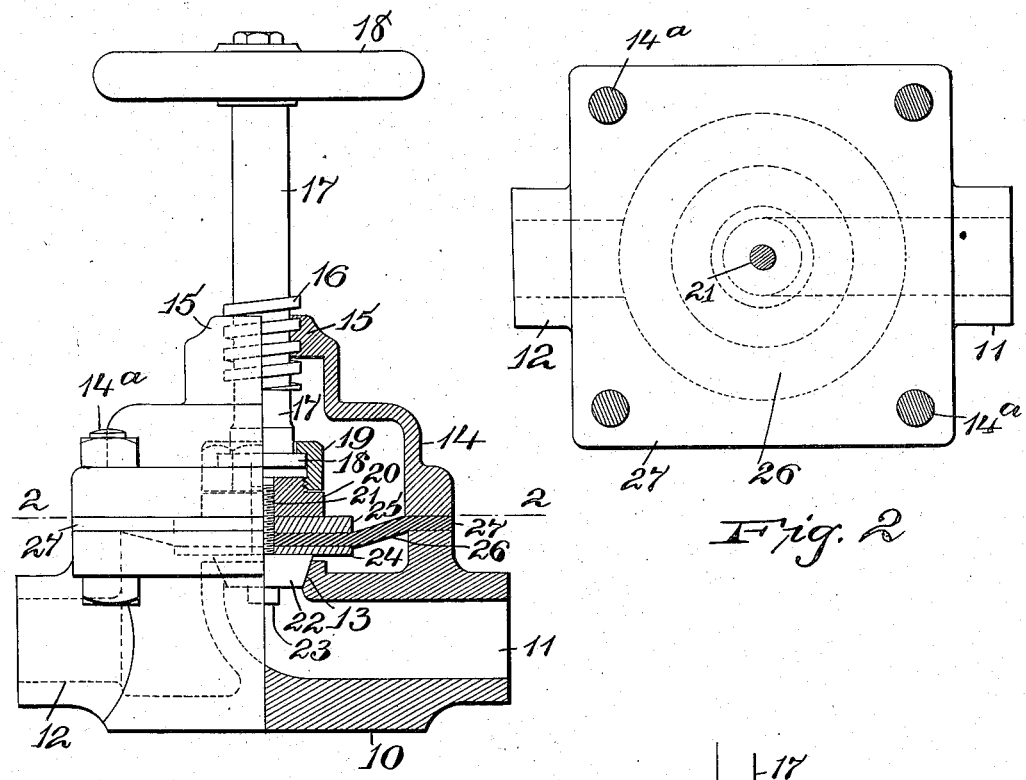

FRANK A. WARTER, OF PERTH AMBOY, NEW JERSEY.

VALVE.

No. 930,635.

Specification of Letters Patent.

Patented Aug. 10, 1909.

Application filed June 13, 1907. Serial No. 378,743.

*To all whom it may concern:*

Be it known that I, FRANK A. WARTER, a citizen of the United States, residing at Perth Amboy, in the county of Middlesex and State of New Jersey, have invented certain new and useful Improvements in Valves; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a valve, and is designed to provide a valve adapted for systems conveying acids, although it can be used for the conducting of any fluid or gas, and the valve is designed to provide a per20 fectly tight closure, and make an easy operating valve.

This valve also provides one that requires no stuffing box around the valve stem, and the closure in the valve is provided for by a diaphragm of flexible material that is arranged to be seated or unseated by the manipulation of the stem of the valve.

The invention is illustrated in the accompanying drawing, in which—

Figure 1 is an elevation of a valve of the improved construction, but showing one half of the casing and the closing portions of the valve in section. Fig. 2 is a section on line 2, 2, in Fig. 1, and Fig. 3 is a section of a modified form of construction.

The valve comprises a lower casing 10, shown in Fig. 1, which is provided with suitable openings 11 and 12, providing inlet and outlet ports, and the casing is provided with a valve seat 13 that is preferably centrally located. Above the casing 10 is the portion 14, of the casing, which is held down by the bolts 14ᵃ. The upper portion 15 of the part 14 of the casing is screw-threaded to receive the screw-threads 16 of a valve stem 17 which is provided with a hand wheel 18, at its top. The lower end of the stem 17 has a flange 18 which is rotatably arranged in a recess in a nut 19, so that the nut 19 is actu50 ated longitudinally by the stem 17, but does not rotate therewith.

Screwed into the nut 19 is a screw-threaded washer 20. Into the washer 20 is screwed a screw 21 that is attached to or integral with a plug 22 that is operated by a suitable projection 23 to allow its insertion and withdrawal. When the screw 21 is screwed home, it binds the disks 24 and 25, and between them secures the diaphragm 26 which is made of flexible material, preferably soft rubber, and has its edges 27 clamped between the lower portion 10 and the upper portion 14 of the casing of the valve.

The plug 22 is preferably tapered to form a fairly tight fit into the seat 13, and is adapted to make a closure for the valve, but the diaphragm is kept away from contact with the valve seat and thus is not subjected to the acid when the valve is shut. It will also be noticed that the tight fit between the parts of the casing and the diaphragm, and the central disks and the diaphragm, makes leakage through the diaphragm impossible, and no stuffing box around or above the screw for operating the valve is necessary.

If desired, I can make the valve as shown in Fig. 3, providing the lower portion 28, of the valve casing, with a central tubular portion forming an outlet 29, and having the right-angled inlet 30 in the side of the casing. This figure shows the diaphragm in its position when it is open, and there is no obstruction or interruption of the flow of liquid through the valve when the valve is open.

This valve can be used for any purpose, but is preferably adapted for acids and the conveying of fluids, the nature of which makes them dangerous when they escape. The rotating stem to operate the withdrawal or seating of the diaphragm on its seat is not the only method that can be employed for causing this movement, and I might also dispose the valve seat differently, and make it of a different form. The diaphragm in this construction is not attacked by acid, except when the valve is open, and this makes the life of the diaphragm much longer than those constructions where the acid has contact with the diaphragm, although only to a slight extent, even when the valve is shut.

Having thus described my invention, what I claim is:—

1. A valve comprising a valve casing having inlet and outlet ports and having a valve seat between them, an upper portion, a stem in screw-threaded engagement with the upper portion and having a flange on its end, a recessed nut on the flanged end of the stem, a washer having a screw-threaded portion fitting in the nut on the end of the stem, disks, a flexible diaphragm arranged between the disks and secured between the casing and the upper portion, and a screw passing through the disks and the diaphragm and into the washer for drawing the parts together.

2. A valve comprising a valve casing having inlet and outlet ports and having a valve seat between them, an upper portion, a stem in screw-threaded engagement with the upper portion and having a flange on its end, a recessed nut on the flanged end of the stem, a washer having a screw-threaded portion fitting in the nut on the end of the stem, disks, a flexible diaphragm arranged between the disks and secured between the casing and the upper portion, a screw passing through the disks and the diaphragm and into the washer for drawing the parts together, and a plug on the screw, the plug being adapted to be seated on the valve seat.

In testimony, that I claim the foregoing, I have hereunto set my hand this thirty-first day of May 1907.

FRANK A. WARTER.

Witnesses:
THEO. DEGENRING,
THOMAS J. SMITH.